P. DEMEURE.
Meat Cutter.
No. 20,019.
Patented April 20, 1858.
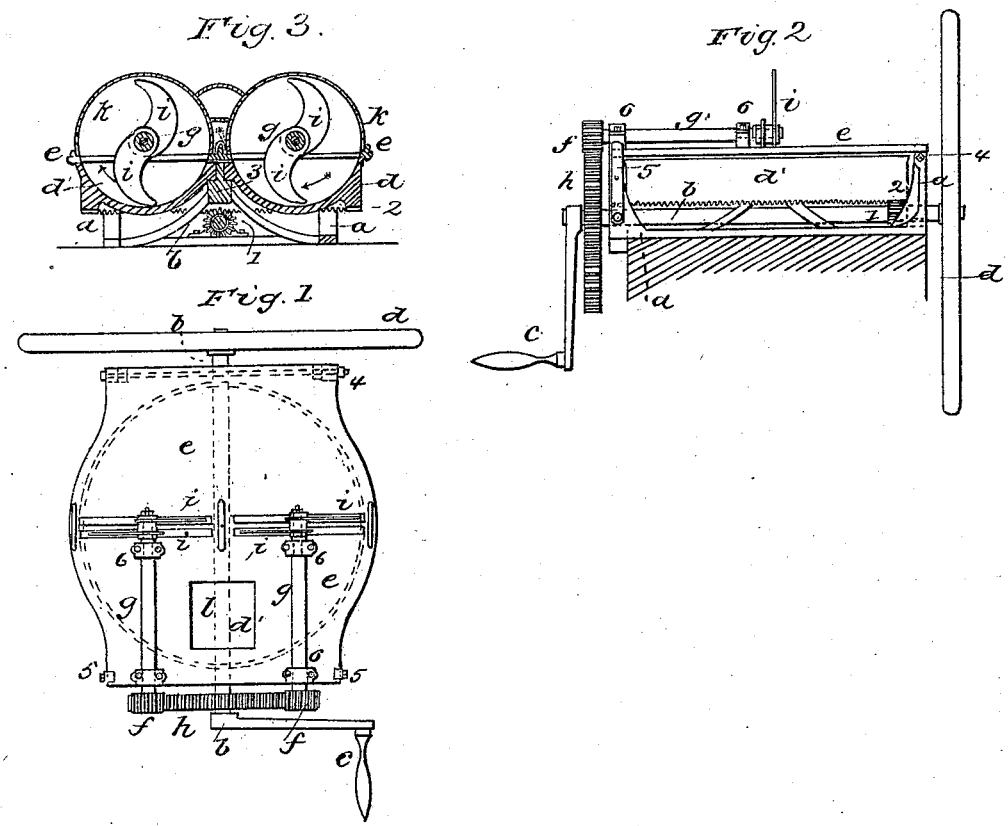

UNITED STATES PATENT OFFICE.

PIERRE DEMEURE, OF BROOKLYN, NEW YORK, ASSIGNOR TO CHARLES CHEPY, OF NEW YORK, N. Y.

MEAT-CUTTER.

Specification of Letters Patent No. 20,019, dated April 20, 1858.

*To all whom it may concern:*

Be it known that I, PIERRE DEMEURE, of Brooklyn, in the county of Kings and State of New York, have invented, made, and applied to use certain new and useful Improvements in Machinery for Subdividing Meats, Vegetables, &c.; and I do hereby declare that the following is a full, clear, and exact description of the construction and operation of the same, reference being had to the annexed drawing, making part of this specification, wherein—

Figure 1 is a plan of the machine complete. Fig. 2 is side elevation and Fig. 3 is a vertical cross section.

Similar marks of reference denote the same parts.

In Letters Patent issued May 24th, 1853, to Stanislas Millet for subdividing meat, &c., a revolving basin is made use of and revolving cutters. My said invention is an improvement on the said patent, which has been devised since the purchase of said Millet's patent by myself, and my said invention has for its object the obviating of certain inconveniences experienced in the aforesaid patent of Millet, rendering the machine fully available.

I will first describe my said machine and then set forth the points which I claim as improvements on aforesaid patents.

In the drawing $a$, is a frame formed as shown, and supporting the horizontal shaft $b$, on one end of which is a handle $c$, for the purposes of rotation, and $d$, is a fly wheel on the other end of said shaft to equalize the motion.

1, is a pinion acting on the teeth 2, on the under side of the basin $d'$. This basin $d'$, is set on a center pin 3, from which it can be lifted when desired for transporting or emptying the contents.

$e$, is a cover hinged at the back edge (at 4) and held down at the front edge by the spring latches 5, 5, by the removing of which the cover can be elevated, carrying with it the cutters and other parts so as to allow free access to the basin $d$, for removing the same, or for taking out the meat or other substances that have been cut up in said basin.

$h$, is a gear wheel on the shaft $b$, driving the pinions $f$, $f$, on the shafts $g$, $g$, which have their journal boxes 6, 6, on the cover $e$.

$i$, $i$, are cutters on the shafts $g$, $g$, acting in the manner shown in Fig. 3 to subdivide the meat, and these cutters passing through slots in the cover $g$ will not throw the meat out of the basin by their centrifugal force. A cover of sheet metal should inclose the cutters as seen in Fig. 3, at $k$, to prevent accidents from coming in contact with the cutters.

In the aforesaid patent of Millet the basin could not be easily removed without taking the nut ($b$) off and in order to empty said basin the cover had to be lifted off by withdrawing pins that passed through ears. This was very inconvenient, and besides this the meat was inserted at the center of the cover near the cutters, much to the danger of the attendant's hands, instead of which I provide the opening $l$, at the front part of the cover, through which articles to be chopped or cut up can be either inserted or removed, and the cutters travel entirely through slots in the cover, insuring that the articles being subdivided are not carried around by the cutters.

By my arrangement of the wheel $h$, and pinions $f$, $f$, an intermediate pinion as used by Millet is dispensed with and I effect an important operation thereby, viz.: my cutters revolving in the same direction and acting on opposite sides of the curved trough of the disk keep the article being cut in the bottom of the trough, whereas Millet's threw the meat to the outer edge; in mine the knives pass through the meat in opposite directions, one set cutting from the center toward the edge, and the other from the edge toward the center of the basin, subdividing and mixing the substances in a far better manner.

Having thus described the nature and operation of my improvements, I do not claim the original invention of said Millet; but

What I claim as my invention and desire to secure by Letters Patent as an improvement on the said patent of Stanislas Millet of May 24th, 1853, is—

1. The opening $l$, in the cover $e$, placed near the front part of said cover for the purposes and as specified.

2. I claim the arrangement of the hinged cover $e$, and latches 5, 5, in connection with the removable basin $d'$, for the purposes and as specified.

3. I claim the arrangement of the cutters $i$, $i$, acting through slots in the cover $e$, in opposite directions on the meat, &c., to be cut as the same is presented by the revolving basin substantially as and for the purposes specified.

In witness whereof I have hereunto set my signature this thirtieth day of March, 1858.

PIERRE DEMEURE.

Witnesses:
LEMUEL W. SERRELL,
THOMAS G. HAROLD.